No. 710,832. Patented Oct. 7, 1902.
W. A. ANSLEY.
COMBINED PLANTER, CULTIVATOR, AND HARROW.
(Application filed Sept. 6, 1901.)
(No Model.) 5 Sheets—Sheet 1.

Witnesses
William A. Ansley, Inventor.
Attorneys

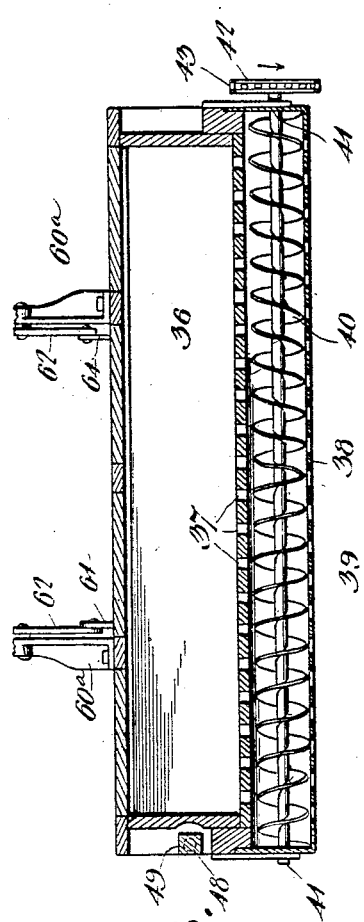

No. 710,832. Patented Oct. 7, 1902.
W. A. ANSLEY.
COMBINED PLANTER, CULTIVATOR, AND HARROW.
(Application filed Sept. 6, 1901.)
(No Model.) 5 Sheets—Sheet 3.

Witnesses
William A. Ansley, Inventor.
by C. A. Snow & Co.
Attorneys

No. 710,832. Patented Oct. 7, 1902.
W. A. ANSLEY.
COMBINED PLANTER, CULTIVATOR, AND HARROW.
(Application filed Sept. 6, 1901.)
(No Model.) 5 Sheets—Sheet 4.

Witnesses
William A. Ansley, Inventor
Attorneys

No. 710,832. Patented Oct. 7, 1902.
W. A. ANSLEY.
COMBINED PLANTER, CULTIVATOR, AND HARROW.
(Application filed Sept. 6, 1901.)

(No Model.) 5 Sheets—Sheet 5.

Witnesses
William A. Ansley, Inventor.
Attorneys

UNITED STATES PATENT OFFICE.

WILLIAM ALAXANDER ANSLEY, OF BRANCHPORT, NEW YORK.

COMBINED PLANTER, CULTIVATOR, AND HARROW.

SPECIFICATION forming part of Letters Patent No. 710,832, dated October 7, 1902.

Application filed September 6, 1901. Serial No. 74,573. (No model.)

*To all whom it may concern:*

Be it known that I, WILLIAM ALAXANDER ANSLEY, a citizen of the United States, residing at Branchport, in the county of Yates and State of New York, have invented a new and useful Combined Planter, Cultivator, and Harrow, of which the following is a specification.

My invention is an improved combined planter, cultivator, and harrow; and it consists in the peculiar construction and combination of devices hereinafter fully set forth and claimed.

Figure 1:
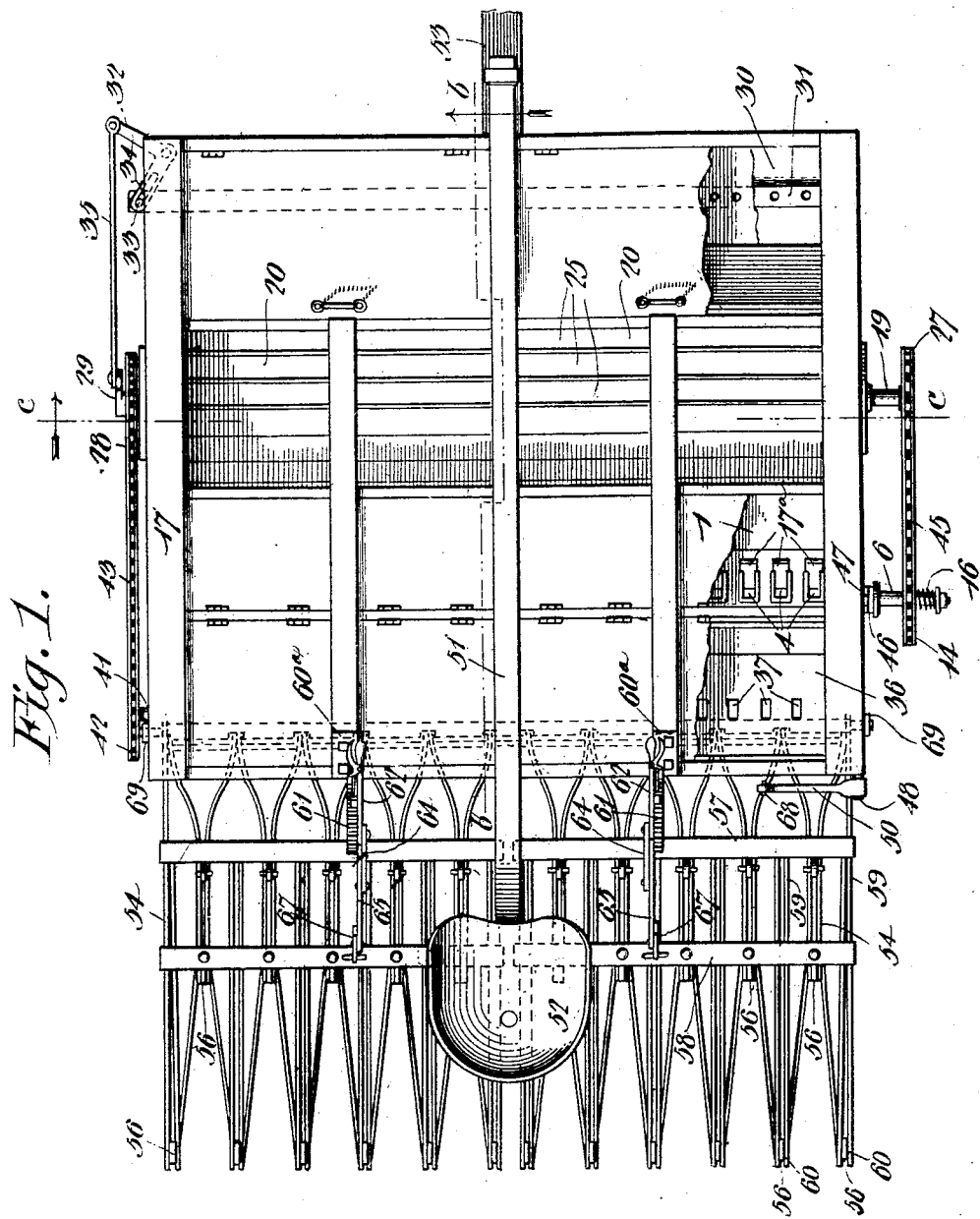
Figure 4:
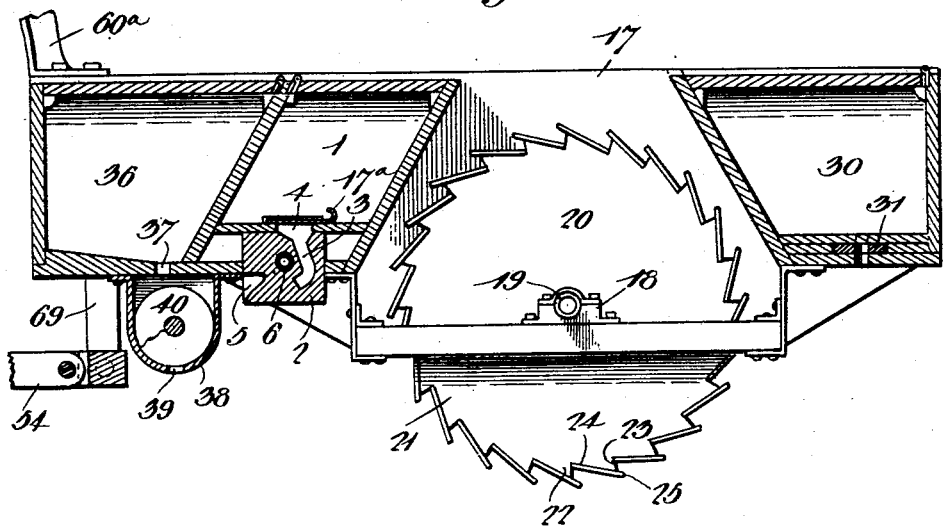
Figure 5:
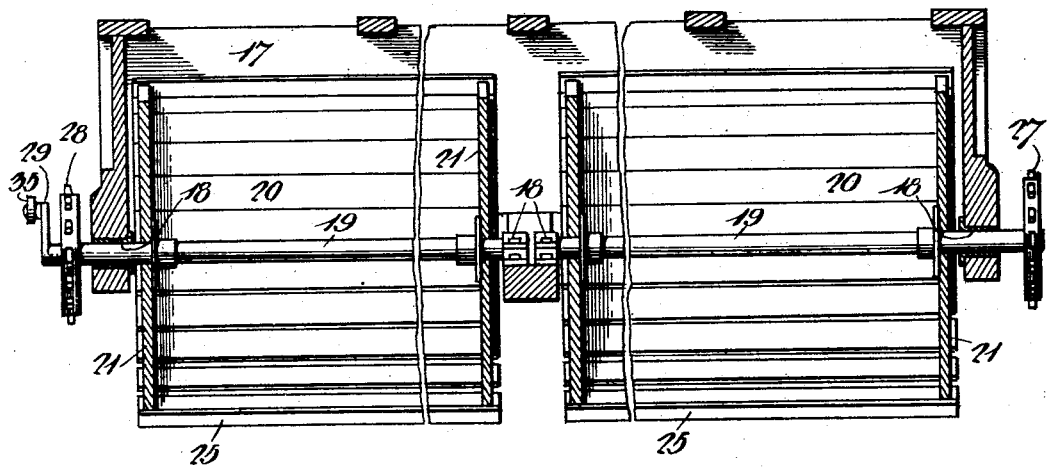
Figure 6:
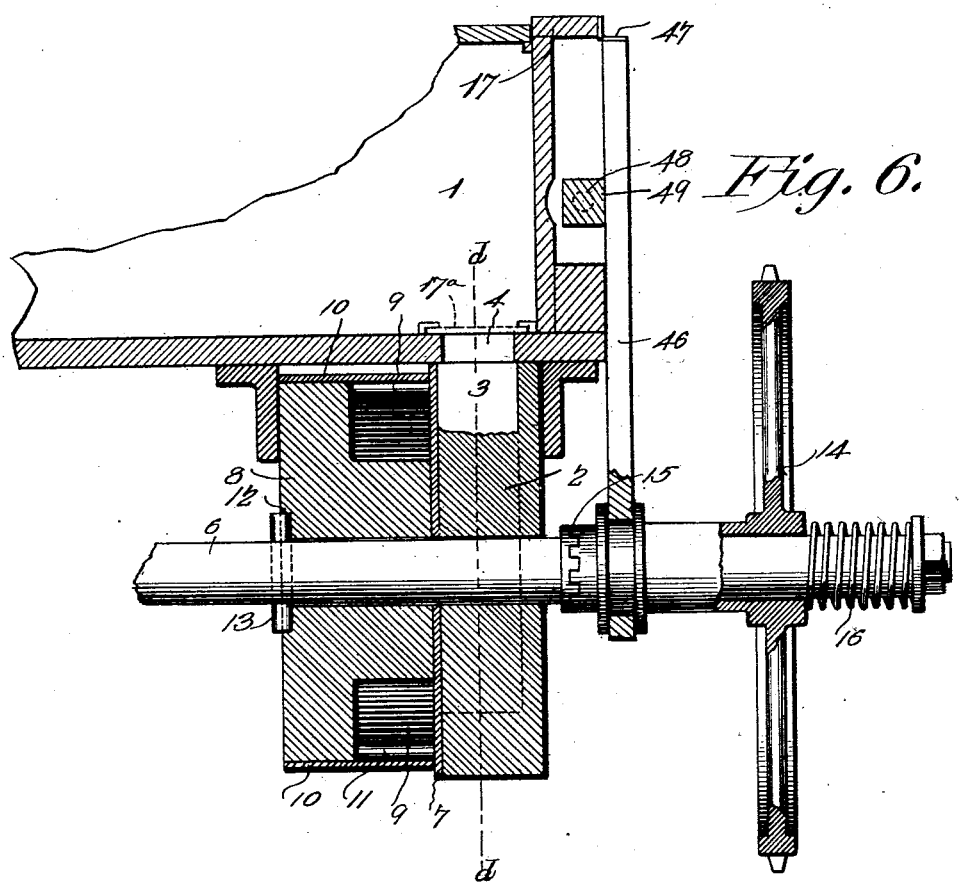
Figure 9:
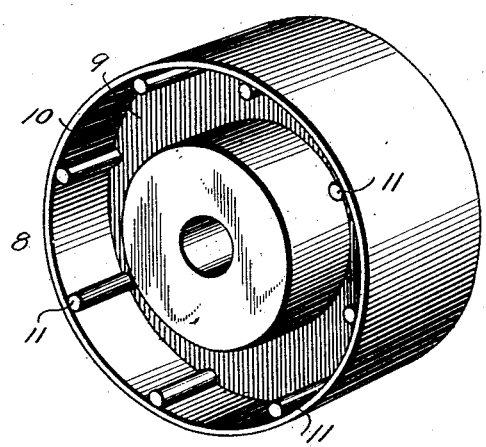
Figure 7:
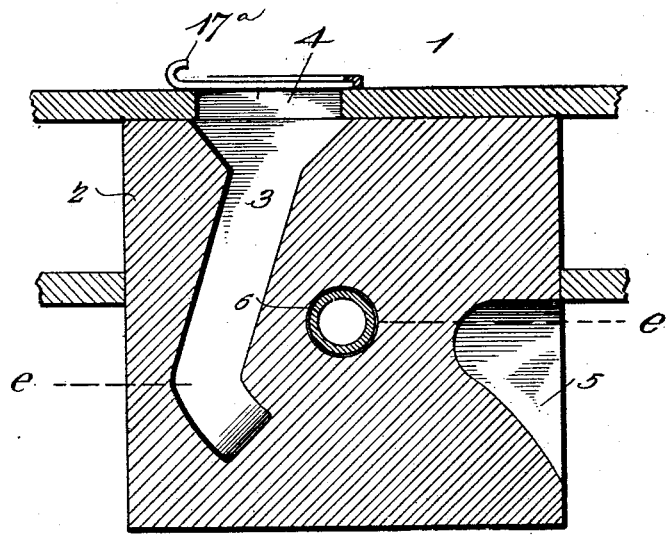
Figure 8:
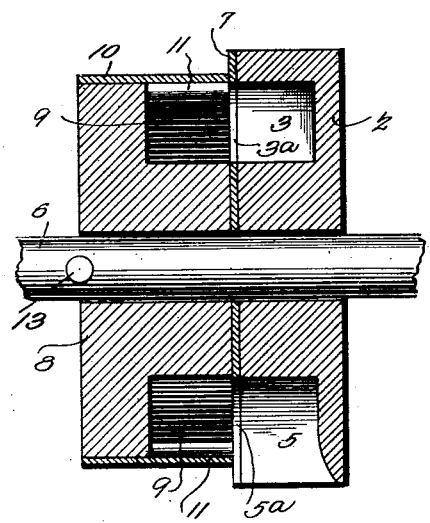

In the accompanying drawings, Figure 1 is a top plan view of a combined planter, fertilizer-distributer, seeder, roller, cultivator, and harrow constructed in accordance with my invention. Fig. 2 is a side elevation of the same. Fig. 3 is a detail transverse sectional view of the hopper, taken on a plane indicated by the line *a a* of Fig. 2. Fig. 4 is a vertical longitudinal sectional view taken on a plane indicated by the line *b b* of Fig. 1. Fig. 5 is a vertical transverse sectional view taken on a plane indicated by the line *c c* of Fig. 1. Fig. 6 is a detail sectional view of the seed-feeding mechanism. Fig. 7 is a sectional view of the same, taken on a plane indicated by the line *d d* of Fig. 6. Fig. 8 is a detail sectional view taken on a plane indicated by the line *e e* of Fig. 7. Fig. 9 is a detail perspective view of the seed-distributing wheel, showing the inside thereof.

In the embodiment of my invention I provide a frame 17, which may be either of the form here shown or of any other suitable form and is provided with bearings 18. In the said bearings is journaled a shaft 19, on which are a pair of rollers 20. The said rollers each comprise heads 21, having serrated edges 22. Each of the said serrations 22 has a radial side 23 and a tangential side 24. The treads of the rollers are formed by boards or bars 25, which are secured on the tangential sides of said serrations. The spaces between the tread-boards are open. It will be observed by reference to Figs. 2 and 4 of the drawings that the tread-boards on their descent on the front portions of the under sides of the rollers as the latter rotate descend in substantially horizontal positions on the clods, which is the most effective in breaking up the clods. Such earth particles as enter the rollers through the openings between the tread-boards are subsequently discharged from the rollers through said openings, as will be understood. It will be further observed by reference to the drawings that the disposition of the tread-boards is such as to cause the same to frictionally engage the earth and secure the rotation of the rollers. At one end of the shaft 19 is a sprocket-wheel 27. At the other end thereof are a sprocket-wheel 28 and a crank 29.

In the front side of the frame 17 is a transversely-disposed hopper 30, adapted to contain grass-seed and the like and provided with any suitable means, including a reciprocating bar 31 for feeding the seeds from the hopper. This reciprocating bar 31 is connected at one end to a bell-crank lever 32 by means of a pin 33, which operates in a slot 34 in one arm of said bell-crank lever. The other arm of said bell-crank lever is connected by a rod 35 to the crank 29. Hence power is communicated to the seeding mechanism from the rollers, as will be understood. In the rear side of the said frame 17 is a transversely-disposed hopper 36, which is adapted to contain fertilizer. The said hopper has a plurality of discharge-openings 37 in its lower side. Beneath the said hopper is a transversely-disposed trough 38, having a plurality of discharge-openings 39 in its lower side. A revoluble worm 40 operates in the said trough and has its bearings in the ends thereof, as at 41. On one end of the shaft of said worm is a sprocket-wheel 42, which is connected to the sprocket-wheel 28 by an endless sprocket-chain 43. Thereby power is communicated from the rollers to the said worm. The latter, as will be understood, serves to discharge fertilizer and to distribute the same on the ground. By appropriately varying the sizes of the sprocket-wheels 28 42 the worm may be driven at any desired rate of speed and the quantity of fertilizer distributed thereby predetermined.

I will now describe my improved mechanism for dropping corn, beans, peas, and other seeds. The frame 17 is provided with a transversely-disposed hopper 1, which, as here shown, is disposed immediately in advance of the fertilizer-hopper 36; but this arrangement may be modified without departing from the spirit of my invention. The hopper 1 may be of any suitable form and size, and a series of seed-dropping mechanisms may be used in connection therewith in the usual manner. In the detail drawings Figs. 6, 7, 8, and 9 one of my improved seed-dropping mechanisms is shown. On the under side of the hopper is a block 2, which depends therefrom and is provided with an inlet-channel 3 on its front side, the upper end of which communicates with a feed-opening 4 in the bottom of the hopper, and the said block is provided on its rear side with a discharge-channel 5, the rear outer side of which is open and the lower side of which is inclined, as shown. The shaft 6 has its bearing in the said block. In practice, as before indicated, a number of the said blocks will be used on the bottom of the hopper and the said shaft will extend through and have its bearings in said blocks. The said shaft is made of tubular form, preferably of a piece of iron or steel pipe of suitable length and diameter. On one side of the block 2 is a metallic plate 7, which is secured to the said block and is provided with a port 3ª, which communicates with the bottom of the inlet-channel 3, and a port 5ª, which communicates with the discharge-channel 5 of the block. The seed-distributing wheel 8, of which in practice a number are used, is loosely mounted on the tubular shaft 6, and the latter is adapted to move endwise in said block and in said distributing-wheel. The latter normally bears snugly against the plate 7 and is provided with an annular groove 9, which communicates with the port in said plate. In practice the distributing-wheel is made of wood or suitable material, an annular rabbet is formed therein on one side, and a rim 10, which is preferably metallic, is then secured on the said wheel and corresponds in width with the thickness of the central integral portion of the wheel, thus forming the outer side of the annular groove 9. A series of pins 11 are driven into the wheel and disposed on the inner side of the said rim, the said pins being thus disposed in the outer side of said groove 9, and when the machine is in operation and said distributing-wheel is in rotation the said pins act as stirrers and flights which convey the seeds from the inlet-port 3ª to discharge-port 5ª. The quantity of seeds dropped by the seed-dropping mechanism may be controlled by varying the speed of the tubular shaft 6, which rotates the seed-distributing wheels. Each distributing-wheel is provided on its outer side with a radial rabbet 12. A pin 13 in the shaft 6 and which projects therefrom is adapted to engage the said rabbet, and thereby lock the seed-distributing wheel to said tubular shaft 6 and cause the former to rotate with the latter. On the said tubular shaft is a sprocket-wheel 14, which is connected by an endless sprocket-chain 45 to the sprocket-wheel 27 on the roller-shaft 19. Said sprocket-wheel 14 is loose on said shaft 6, and a clutch 15 is provided to lock said wheel to said shaft. A spring 16 bears against said clutch to keep the said wheel normally locked to said shaft. The said wheel may be readily detached from said shaft and one of greater or less diameter substituted in its stead to cause said shaft 6, and hence the distributer-wheels carried thereby, to be rotated at the required rate of speed. The spring 16 normally maintains the tubular shaft in position, with its pins 13 in engagement with the rabbets 12 of the distributing-wheels to rotate the latter. In the event that a nail or other obstruction is fed to one of the distributer-wheels with the seeds and interferes with the rotation of the distributer-wheels the shaft 6, being longitudinally movable, will by the spring 16 be permitted to move to the required extent to cause the pins 13 to move out of the rabbet 12 of the obstructed distributing-wheel, hence avoiding breakage and permitting of the rotation of the tubular shaft 6 without injury to the machine.

Any suitable means may, within the scope of my invention, be employed to regulate the feed of the seeds to the distributer-wheels. In the drawings I show slide-valves 17ª for this purpose. Drill-tubes of suitable form may be employed to convey the seeds to furrows made by the drills at the lower ends of the drill-tubes. When the seeds are to be dropped on the surface of the ground and harrowed or plowed in by the cultivator attachment hereinafter described, the drill-tubes are not used.

When the machine is used for planting wheat, rye, oats, or the like on land which is to be sowed in grass or clover, both of the seeding mechanisms hereinbefore described will be simultaneously operated. Either of said seeding mechanisms may, however, be used independently of the other.

The clutch 15 is operated by an arm 46. The upper end of the said arm is hinged to one side of the frame 17, as at 47. A rock-shaft 48 is journaled in bearings on one side of said frame 17 and is provided with a cam 49, which operates the said arm 46, and hence causes the latter to shift the clutch when said rock-shaft is turned. Said rock-shaft has an operating-arm 50.

Longitudinally disposed over the central portion of the frame 17 is an inclined bar 51, which supports the seat 52 for the driver. The front end of said seat-supporting bar is connected to the draft-tongue 53.

I employ in connection with the seeding and fertilizer-distributing machine a cultivator for stirring the soil as it is seeded or for plowing in and covering the seeds. The cultivator comprises a pair of frames 54, provided with cultivating teeth or points 55, which are carried by standards 56. Each cultivator-frame comprises a pair of cross-bars 57 58, disposed with the former in advance of the latter, and a series of beams 59, to which the standards 56 are pivotally connected, as at 60. By thus pivoting the standards to the beams the cultivating points or shovels may be upturned out of engagement with the earth. Hence the cultivating-points may be so disposed that all or any desired number of them may operate in the soil. On the rear side of the frame 17, on opposite sides of the seat-supporting bar 51, are brackets 60ª, each of which has a segment-rack 61. Hand-levers 62 are pivoted to the said brackets and provided with spring-pressed locking-dogs 63, of the usual construction, which by engagement with the segment-racks secure said hand-levers at any desired adjustment. The lower ends of said hand-levers are connected by links 64 to links 65. The latter have their front ends pivotally connected to the rear side of frame 17, as at 66. The rear ends of said links 65 are connected to the cross-bars 58 of the respective harrow-frames by links 67. It will be understood from the foregoing and by reference to the drawings that the hand-levers and their connections enable the harrow-frames to be raised and lowered at will by the driver. A rod 68 connects the arm 50 to one of the cultivator-frames, as shown in Fig. 2. Hence when the said cultivator-frame is raised to an inoperative position said arm is turned and caused to operate the cam 49 on rock-shaft 48, and thereby unclutch wheel 14 from the shaft 6. The front ends of the cultivator-frames are pivotally connected to hangers 69, which depend from the sides of frame 17. The said cultivator-frames may be disconnected from said hangers and from the links 67 and suitable harrow-frames substituted in their stead when it is desired to use the machine for harrowing.

Having thus described my invention, I claim—

1. The combination of a hopper, a block having a feed and a discharge channel, a revoluble longitudinally-movable shaft, a spring to press the same normally in one direction, a distributing-wheel loose on said shaft and means to lock said distributing-wheel to said shaft and to automatically unclutch the same therefrom, substantially as described.

2. The combination of a hopper, a seed-distributing wheel fed therefrom, a revoluble shaft carrying said wheel, said shaft being longitudinally movable in its bearing, and in said wheel, coacting devices to lock said wheel to said shaft, and a spring to normally keep said coacting devices in operative engagement, for the purpose set forth, substantially as described.

3. In a seed-dropping mechanism, the combination of a hopper, a block having a feed and a discharge channel, a plate on one side of said block having ports communicating with said channels, a shaft revoluble in said block and a distributing-wheel on and rotated by said shaft, said wheel having one side bearing against said plate and provided with an annular groove which communicates with said feed or inlet and discharge ports, substantially as described.

4. The combination of a hopper, a seed-distributing wheel fed therefrom, a revoluble shaft carrying said wheel, said shaft being longitudinally movable in its bearing and in said wheel, coacting devices to lock said wheel to said shaft, a power-wheel, loose and movable endwise on said shaft, said shaft and power-wheel having a clutch to lock said wheel to said shaft, and a spring coacting with said clutch to normally lock said power-wheel to said shaft and coacting with said distributing-wheel and shaft-locking devices to lock said distributing-wheel to said shaft, substantially as described.

5. The combination of a supporting-frame, a revoluble supporting element therefor, a seeding mechanism, connections including a clutch between said seeding mechanism and said revoluble supporting element, a rock-shaft having a rock-arm and a cam, a shifting arm connected to the frame and the clutch and engaged by said cam to operate the clutch, a cultivating-frame connected to said supporting-frame, a lever carried by the supporting-frame, connections between the lever and the cultivating-frame to raise and lower the latter, and a rod connecting said cultivating-frame to said rock-arm, whereby when said cultivating-frame is raised said seeding mechanism is thrown automatically out of gear, substantially as described.

In testimony that I claim the foregoing as my own I have hereto affixed my signature in the presence of two witnesses.

WILLIAM ALAXANDER ANSLEY.

Witnesses:
GEORGE S. SHEPPARD,
JOHN A. UNDERWOOD.